Patented June 21, 1927.

1,633,221

UNITED STATES PATENT OFFICE.

WILLIAM MENDEL, OF BEVERLY, NEW JERSEY, ASSIGNOR TO SAMUEL A. NEIDICH, OF EDGEWATER PARK, NEW JERSEY.

PROCESS OF DYEING FILAMENTS AND FILMS FORMED FROM VISCOSE.

No Drawing. Application filed May 23, 1925. Serial No. 32,451.

Filaments and films are ordinarily formed by coagulating viscose (sulphocarbonate) to cellulose hydrate by suitable chemical solutions, and such products may be satisfactorily colored by sulphur dyes and dyes of other classes, preferably what are known as "direct" dyes, but all of the dyes ordinarily employed for that purpose are unfavorably affected either by alkali or acid, or sulphur bearing compounds, either in the viscose or used in treatment of the filament subsequent to coagulation. Therefore, although it has long been recognized to be desirable to dye such filaments and films during the process of manufacture, so far as I am aware, the difficulties in the way of such accomplishment have heretofore proven insurmountable, because any attempt to dye such products during their manufacture is defeated by interference of alkali or acid or sulphur or sulphur bearing compounds carried by the products.

Therefore, an object and effect of my invention is to provide a method and means whereby such cellulose hydrate products may be successfully dyed during their process of manufacture.

After an extended research both for a solution to the problem of dyeing aforesaid and the problem of removing sulphur bearing impurities from the coagulated and precipitated cellulose hydrate; I have discovered that the action of $PO_4$ ions of tri-sodium phosphate ($Na_3PO_4$) on the cellulose hydrate either previous to or coincident with the dyeing of the latter, removes all of the complexes injurious to direct dyes, i. e., dyes which are effective without the use of a mordant, or special alkaline or acid solutions, and that, therefore, the impure cellulose hydrate filaments or films may be satisfactorily dyed by either (1) treating them with said tri-sodium phosphate in aqueous solution before subjecting them to the action of the dye, or (2) by treating them with a single solution including such tri-sodium phosphate and the dye.

This application includes claims limited to the second named procedure, and the other alternative procedure aforesaid is claimed in my copending application Serial No. 32,450, filed May 23, 1925. As an example of the species of my invention herein claimed; I coagulate viscose to form a filament of impure cellulose hydrate, by any suitable means, and subject said filament to the action of tri-sodium phosphate by immersing it in aqueous solution containing, say, three per cent thereof, and say, two per cent of direct black dye. Such percentages may be employed with any other direct dye of any color, shade or tint. Said percentages are conveniently calculated with reference to the dry weight of the finished filaments. I find it convenient to retain the filament in such bath until the dye is exhausted, say, from one and a half to two hours; while maintaining the same at from 50° to 100° C.; in accordance with the kind of dye used; certain direct dyes being more efficient at the higher temperature aforesaid, whereas, certain sulphur dyes are more effective at lower temperatures.

The effect of such treatment is to change to soluble form the free sulphur and insoluble sulphides which are left in and adherent upon the film by the ordinary coagulating process. Such treatment of the filament with tri-sodium phosphate is preferably immediately followed by rinsing the filament with water to eliminate therefrom the sulphur bearing impurities thus rendered soluble. The filament may then be dried, preferably under tension.

As above contemplated, my invention includes any application of $PO_4$ ions to coagulated or precipitated viscose, either before, or simultaneously with, the subjection of the same to the action of dye, and before such products have been dried.

Therefore, I do not desire to limit all of my claims to the specific details of the procedure herein contemplated, as it is obvious that various modifications may be made therein without departing from the essential features of my invention, as defined in the appended claims.

I claim:

1. The method of manufacturing dyed articles from viscose (sulphocarbonate) which consists in subjecting viscose to the action of a coagulating or precipitating element and then subjecting the precipitated articles to the action of tri-sodium phosphate ($NaPO_4$) and of a dyeing element in the same aqueous solution, before drying such articles.

2. The method of manufacturing dyed articles from viscose (sulphocarbonate) which consists in subjecting viscose to the action of a coagulating or precipitating element and thereafter contemporaneously subjecting the precipitated articles to the action of tri-sodium phosphate ($Na_3PO_4$) and a dyeing element before primarily drying such articles.

3. The method of manufacturing dyed articles from viscose which consists in coagulating viscose to impure cellulose hydrate and thereafter contemporaneously subjecting such coagulated product to the action of a dyeing medium and of $PO_4$ ions, before primarily drying such articles.

In testimony whereof, I have hereunto signed my name at Burlington, New Jersey, this 20th day of May, 1925.

WILLIAM MENDEL.